United States Patent [19]

Beauchamp

[11] 4,375,294

[45] Mar. 1, 1983

[54] JOGGING VEHICLE

[76] Inventor: Carl C. Beauchamp, 565 Shippeetown Rd., East Greenwich, R.I. 02818

[21] Appl. No.: 242,369

[22] Filed: Mar. 10, 1981

[51] Int. Cl.³ .................... B62B 11/00; A63H 3/00
[52] U.S. Cl. ........................ 280/87.02 R; 272/70.3
[58] Field of Search .............. 280/87.02 R, 87.02 W, 280/12 R, 42, 1.5, 63, 87.01, 271; 128/83.5, 25 R; 272/70.3–70.4, 93, 126, 70; 297/5; 135/67

[56] References Cited

U.S. PATENT DOCUMENTS

| 588,495 | 8/1897 | Smith | 280/271 |
|---|---|---|---|
| 2,165,700 | 7/1939 | Glynn | 272/70.4 |
| 2,278,901 | 4/1942 | Smock | 272/70.4 |
| 3,180,678 | 4/1965 | McCabe | 280/87.03 |
| 3,337,240 | 8/1967 | Rizzato | 280/278 |

FOREIGN PATENT DOCUMENTS 172785 6/1906 Fed. Rep. of Germany ... 280/87.02

Primary Examiner—Joseph F. Peters, Jr.
Assistant Examiner—Timothy Roesch
Attorney, Agent, or Firm—Barlow & Barlow Ltd.

[57] ABSTRACT

The vehicle has two spaced wheels with a frame extending therebetween which frame essentially consists of substantially spaced parallel bars with a portion on the bars that may be gripped by the user. The frontal section of the frame has journaled thereto a fork that supports a wheel, which fork is adapted to rotate under restraint so that directional control of the vehicle may be had.

4 Claims, 4 Drawing Figures

JOGGING VEHICLE

BACKGROUND OF THE INVENTION

This invention relates particularly to a personal vehicle that is designed particularly for jogging and/or for assisting an advanced medical patient to become further ambulatory. The device allows the user to increase his exertion while exercising. In jogging or otherwise running for physiotherapy purposes, there is a desire on the part of many users to be able to carry along several articles of personal belongings, such as radios, beverages, or food bars, and in some way be able to identify the time and distance which one travels. In addition, in certain instances for conditioning exercises it may be appropriate to have the vehicle weighted down so that more leg force is used to drive the same along the ground, and this can be accomplished with a two-wheeled device, which as mentioned before can also serve as a physiotherapy unit to strengthen the leg muscles of patients who have become ambulatory and yet need some support means to maintain their body erect.

There are examples in the prior art of walkers which are completely equipped with wheels, as for example, in U.S. Pat. No. 4,159,110 and also in U.S. Pat. No. 1,253,314. In addition, of course, there are many examples of two-wheeled bicycle-like vehicles, but nowhere in the prior art known is there a two-wheeled vehicle with a spaced frame which will allow a person to run or walk in-between the frame.

SUMMARY OF THE INVENTION

The vehicle which is a two-wheeled vehicle is constructed with the jogger, hiker and ambulatory patient in mind. It provides a device to which simple clocks, odometers and speedometers may be attached as well as baskets for carrying articles and safety equipment such as lights and reflectors, and is simply formed of a longitudinal frame that may be made from tubular stock, the frame consisting essentially of two spaced members which are joined at either end by U-shaped portions and to which at either end there is attached a wheel. At the front end of the vehicle, a fork is attached for controlling the front wheel, which fork is provided with a dog leg arrangement so as to give proper longitudinal stability to the device.

DESCRIPTION OF THE PREFERRED EMBODIMENT

Figure 1:
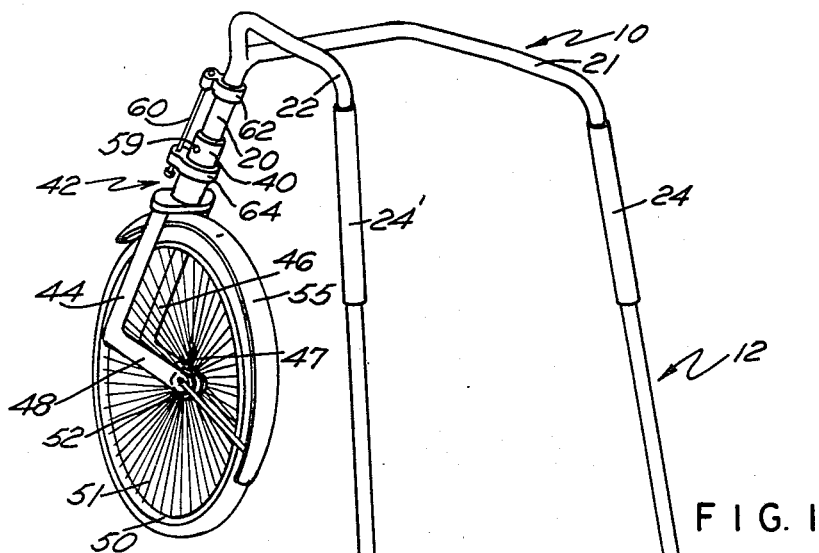
FIG. 1 is a perspective view of the jogging vehicle of the present invention.

The jogging vehicle has been illustrated comprising a main frame that consists of a frontal portion generally designated 10, an intermediate portion generally designated 12, and a rear portion, generally designated 14. The frontal portion is generally U-shaped and at the bight of the U has a depending post 20. The U section is preferably made from tubular stock and has two spaced portions 21, 22 which are continued into the intermediate section 12 where gripping means 24, 24' are provided, the intermediate section extending downwardly at an acute angle to a vertical rising from the surface. Thence the tubular members extend rearwardly to a terminus as at 26, 26'. A U-shaped rear section has portions 28, 28' that are received within the tubular members and have adjusting detents or pin portions as at 30, 30' to adjust the extension of the rear section. Depending from the rear section 14 on brackets 34 there is journally mounted as at 35, a wheel 36.

The frontal section of the vehicle, as was eluded to above, has a post 20 depending from the frontal U-shaped portion thereof. This post 20 supports a tubular member 40 of a front fork generally designated 42 which is bifurcated into a pair of arms 44, 46 and has a dog leg portion respectively designated 47 and 48. To the dog legged portion there is journaled a wheel 50 which has the usual spokes 51 that support the rotative hub 52. A mud guard 55 may be provided for the front wheel 50 which is secured to the fork by brackets (not shown).

To permit the vehicle to be adjusted for persons of various heights, the post 20 is provided with a plurality of circular notches such as 58 into which a pin 59, that extends radially inward from the upright tubular portion 43 of the fork 42, may ride. Also, as previously noted, the length of the frame may be adjusted by withdrawing rear section 14 from the tubular frame.

Figures 3, 4:
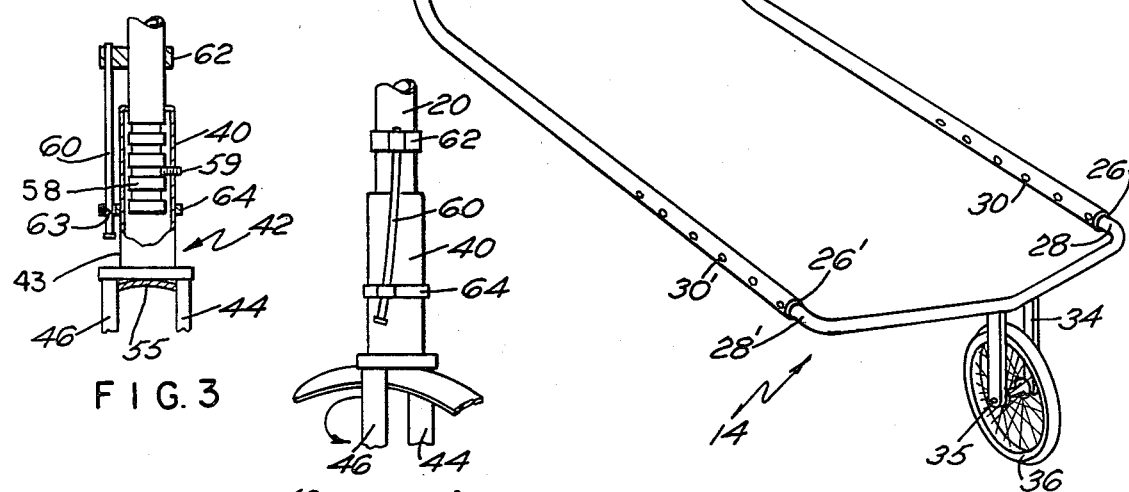
FIG. 3 is a partial sectional view showing the interconnection between the frontal section and the fork.
FIG. 4 is a partial elevational view showing the restraining means between the front section and the fork.
Figure 2:
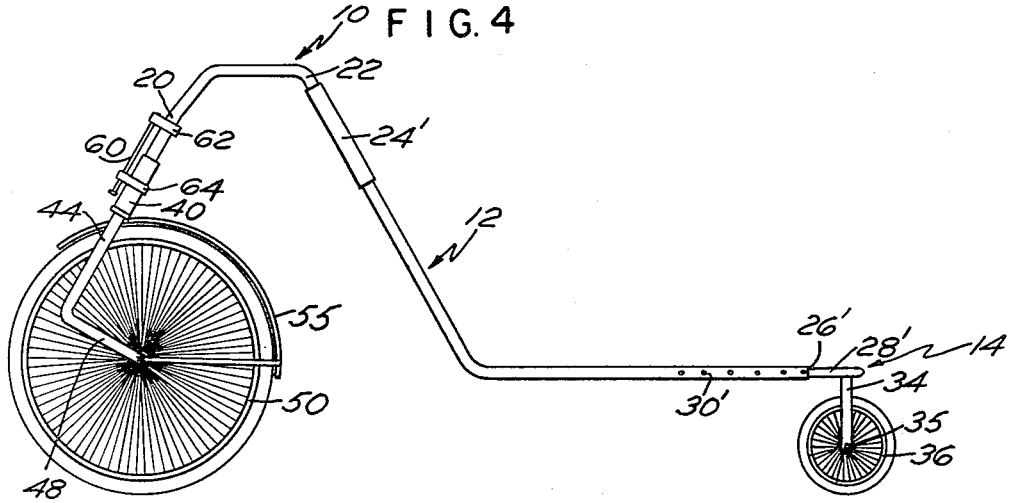
FIG. 2 is a side elevational view thereof, on a slightly reduced scale.

To maintain directional stability, one end of a spring rod 60 is attached to post 20 by a circular claw 62 while the other end is slidably received in an aperture 63 of a collar 64 that is attached to the tubular portion 43 of fork 42. In use the spring 60 will maintain alignment of wheel 50, but when directional movement is desired, the fork may rotate slightly under restraint as diagrammed in FIG. 4 of the drawings.

In use the user stands between the two longitudinal frame members and grips the hand grips 24, 24' and pushes the vehicle. Leaning the vehicle and applying slight pressure in one direction or the other will cause it to turn at the dog legged portion of the fork that supports the front wheel and will maintain normal in-line motion as long as the vehicle is maintained in a substantially upright position, that is in a general vertical attitude as related to the ground or surface over which the vehicle is used.

What is claimed is:

1. A jogging vehicle comprising a pair of spaced bars extending generally horizontally at the rear portions and rising at acute angles to the vertical at their forward portions, said bars being spaced sufficiently to accommodate a jogger between them; a first U-shaped bar connected to the rear spaced ends of the horizontal portions;

a single wheel supporting said first U-shaped bar;
   means including a second single wheel support joining the forward portions of said spaced bars;
   said two wheels being in tandem relation;
   handle grip means on said forward rising portion of the spaced bars to maintain the vehicle vertical or at an angle to the vehicle for turning the vehicle.

2. A jogging vehicle as in claim 1 wherein said forward joining means has horizontal portions to which articles may be attached.

3. A jogging vehicle as in claim 1 wherein said first U-shaped bar has a telescoping relation with said horizontal portion and means to hold said telescoping relation in different adjusted positions to vary the length of said vehicle.

4. A jogging vehicle as in claim 3 wherein the second wheel support means is vertically adjustable to accommodate various height joggers.

* * * * *